US005215162A

United States Patent [19]

Parks et al.

[11] Patent Number: 5,215,162

[45] Date of Patent: Jun. 1, 1993

[54] FOLDABLE SAWHORSE

[76] Inventors: Roby A. Parks, 2161 Huntleigh Rd., Springfield, Ill. 62714; W. Allan Shears, 411 S. 3rd St., Divernon, Ill. 62530

[21] Appl. No.: 891,736

[22] Filed: Jun. 1, 1992

[51] Int. Cl.[5] .................... F16M 11/00

[52] U.S. Cl. .................... 182/153; 182/225; 182/181

[58] Field of Search .................... 182/153-155, 182/225-227, 181-186

[56] References Cited

U.S. PATENT DOCUMENTS

| | | | |
|---|---|---|---|
| D. 274,365 | 6/1984 | Lipinski . | |
| D. 276,074 | 10/1984 | Wagster . | |
| D. 279,606 | 7/1985 | Merians . | |
| 1,224,893 | 5/1917 | Beckwith . | |
| 1,935,896 | 11/1933 | Wertz . | |
| 2,666,673 | 1/1954 | Hughes | 182/225 |
| 2,829,927 | 4/1958 | Sword . | |
| 2,874,004 | 2/1959 | Tucker . | |
| 2,925,140 | 2/1960 | Thielepape . | |
| 3,045,777 | 7/1962 | Dintelmann . | |
| 3,502,174 | 3/1970 | Cannon . | |
| 4,508,194 | 4/1985 | Freewalt et al. | 182/225 X |

FOREIGN PATENT DOCUMENTS

| | | | |
|---|---|---|---|
| 787309 | 9/1935 | France | 182/155 |

*Primary Examiner*—Alvin C. Chin-Shue
*Attorney, Agent, or Firm*—Robert A. Brown

[57] ABSTRACT

A foldable work support apparatus includes an elongated cross beam and first and second leg units each hingedly attached to the cross beam with the upper portion of the leg unit being located beneath the cross beam, the hinged connections permitting the leg units to pivot beneath the cross beam between a use position in which the leg units extend at right angles to the axis of the cross beam and a storage position in which the leg units are coplanar with the cross beam, and latching mechanisms for latching each of the leg units in the use position.

25 Claims, 9 Drawing Sheets

FOLDABLE SAWHORSE

BACKGROUND OF THE INVENTION

The present invention relates generally to adjustable, base support, work apparatus, such as scaffolds, portable trestles, foldable support members and the like used by carpenters, bricklayers, painters, plasterers and other workers employed in the building and construction industry. More particularly, the present invention is concerned with a foldable sawhorse including supporting leg units supporting a cross beam therebetween to provide a unitary structure wherein pivotal connections for the legs permit the apparatus to be quickly collapsed, easily folded for ease of transportation, and stored in a minimum amount of space when not in use.

DESCRIPTION OF THE PRIOR ART

There are many examples in the prior art of attempts to improve sawhorses or trestles by having hinged pairs of legs that may be folded into and out of latched engagement with an upper horizontal cross beam member so as to allow the work piece to stand freely and firmly when in operation to support scaffolding, picnic tables, flat work areas, and the like. An example of this type of construction may be found in U.S. Pat. No. 3,502,174 which discloses V-shaped pairs of legs with apices mounted under end portions of the cross beam. Each V-shaped leg is hinged to the under side of the cross beam and requires a knee brace member extending between the leg to connect with the under side of the cross beam at a point removed from the hinge connection so as to establish stability of the structure during operation thereof.

Another example of prior art structure may be found in U.S. Pat. No. 2,925,140 which discloses a collapsible trestle that includes a cross beam with a pair of supporting leg units at each end wherein the leg units are folded to a superimposed position on the cross beam to occupy a small amount of space for convenient transportation and storage.

A further example is shown in U.S. Pat. No. 3,045,777 wherein the connection between the cross beam and each leg includes a U-shaped saddle member that is connected to a horizontal rod extending through holes formed in brackets that accommodate the cross beam, such as a two-by-four wood member. The primary purpose of the invention is to provide a unit that adapts to uneven floor surfaces.

Additional examples of the state of the art may be found in U.S. Pat. Nos. 1,224,893; 1,935,896; 2,829,927; 2,874,004; and in U.S. Design Pat. Nos. DES 274,365; DES 276,074; and DES 279,606.

SUMMARY OF THE INVENTION

Accordingly, it is a primary object of the present invention to provide an improved foldable support apparatus which includes a cross beam and a plurality of supporting leg units disposed adjacent outer ends of the cross beam.

It is a further object of the present invention to provide an improved foldable support apparatus wherein the supporting leg units are adaptable to be changed from a work position to a storage or carry position.

It is an additional object of the present invention to provide an improved foldable support apparatus including hinged connections between the cross beam and the supporting leg units.

It is yet another object of the present invention to provide an improved foldable support apparatus wherein hinged connections between the cross beam and the supporting leg units include incrementally adjustable detent mechanisms for positioning the leg unit in any one of a plurality of positions about 180°.

These and other objects are achieved by the present invention which provides a foldable work support apparatus comprising an elongated cross beam having a top and a bottom, first and second ends, and first and second side, and first and second leg assemblies. A first attachment means is provided for attaching the first leg assembly to the cross beam near the first end thereof. A second attachment means is provided for attaching the second leg assembly to the cross beam near the second end thereof. Each of the attachment means includes means defining a pivot axis which extends substantially perpendicular to the bottom of the cross beam, permitting the associated leg assembly to pivot beneath the cross beam about the pivot axis between a use position and a storage position.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

DESCRIPTION OF A PREFERRED EMBODIMENT

Figure 1:
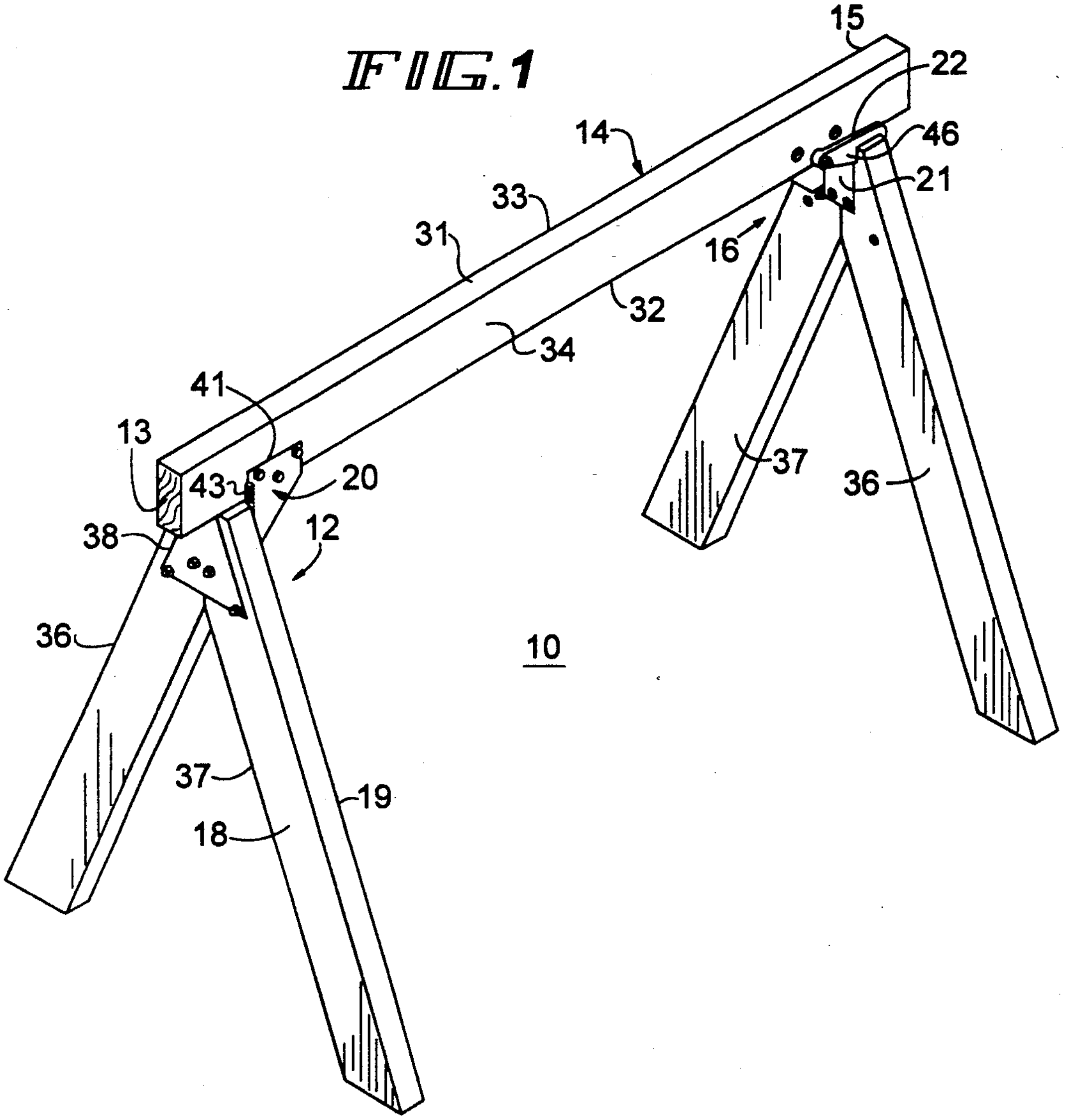
FIG. 1 is a perspective view showing a foldable sawhorse embodying the invention depicted in a working or operative position.

Referring now to FIGS. 1-6 of the drawings, there is shown a foldable work support or sawhorse apparatus generally identified by the reference numeral 10. The apparatus 10 includes a leg unit 12 disposed at one end 13 of a cross beam 14 and a leg unit 16 disposed at the other end 15 of the cross beam 14. Each of the leg units 12 and 16 is hingedly connected to the cross beam 14 by an attachment means, embodied as two hinge assemblies generally identified by reference numerals 20 and 21 hereinafter explained in greater detail. The hinge assemblies 20 and 21 permit the leg units 12 and 16 to be pivoted between a use position and a storage position.

Figure 2:
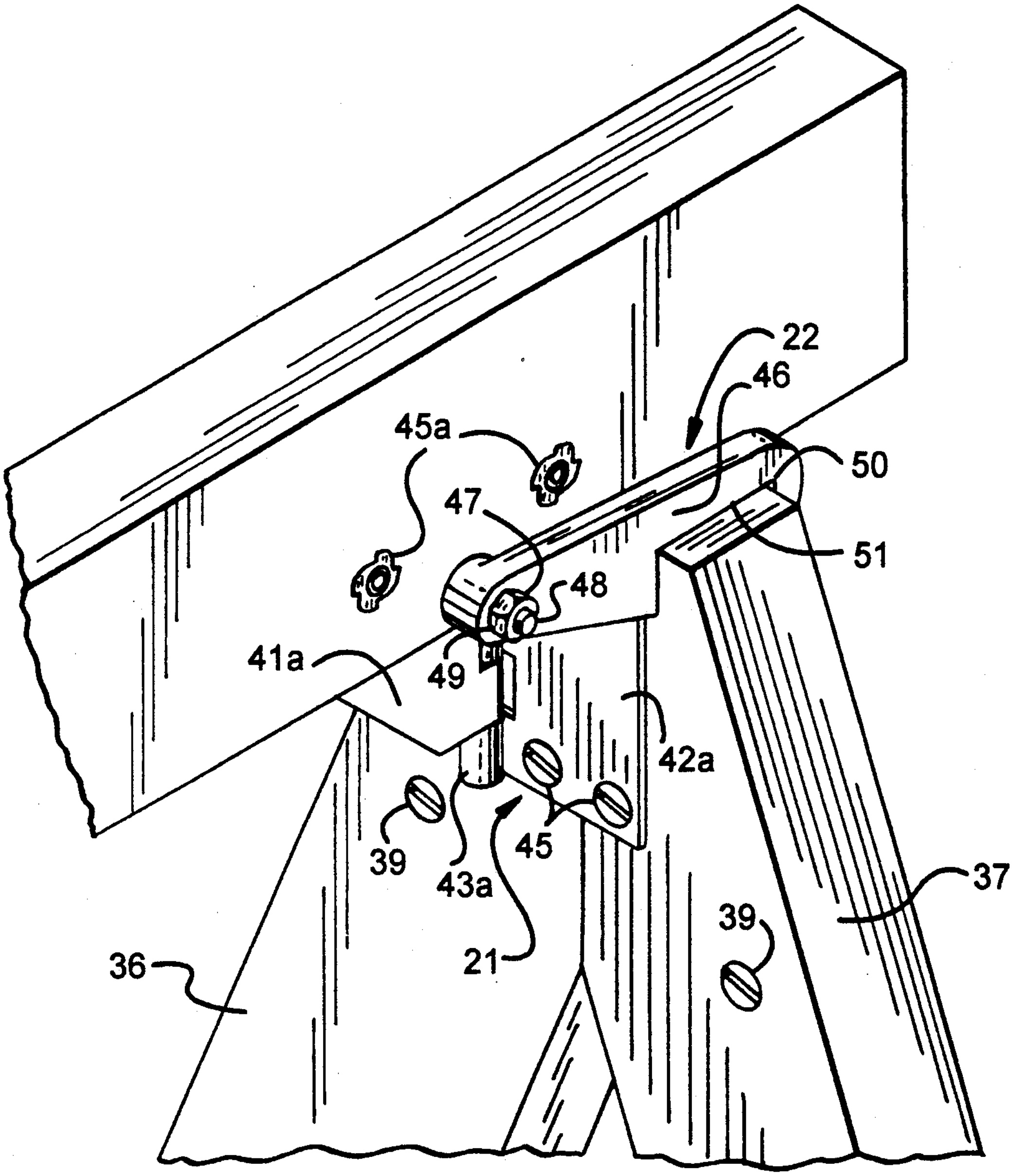
FIG. 2 is a close up perspective view showing a lock at one end which holds the legs in either the working or storage positions.
Figure 3:
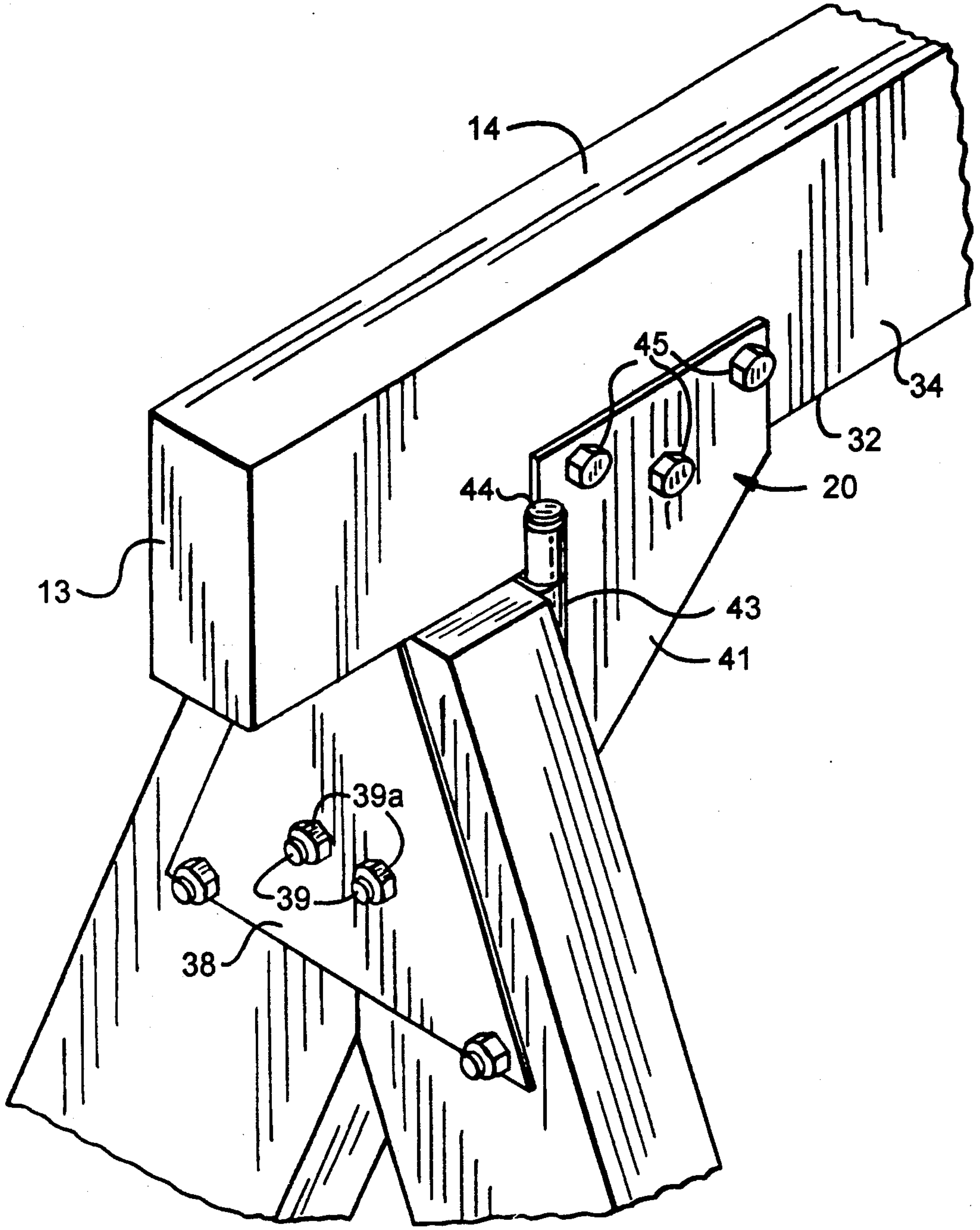
FIG. 3 is a close up perspective view showing a hinge located at the other side of the sawhorse from the lock.
Figure 6:
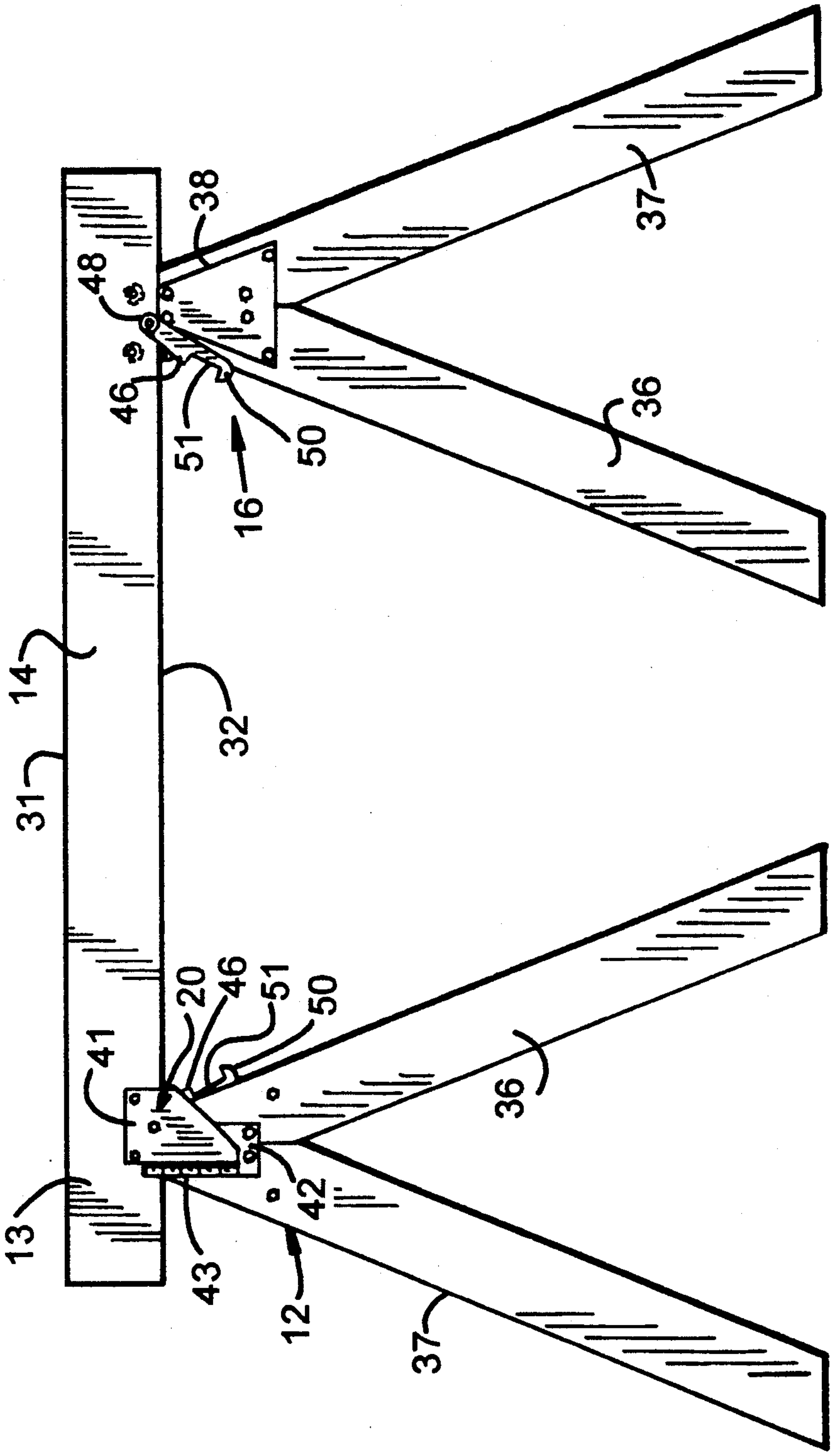
FIG. 6 is a side elevation overall view showing the sawhorse in the storage, position, wherein the lock secures the legs in the storage position for easy transportation.

In the use position shown in FIG. 1, the leg units 12 and 16 each lie in planes transverse to the axis of the cross beam 14. In the storage or transport position shown in FIG. 6, the leg units 12 and 16 are both coplanar with the cross beam 14. The apparatus 10 includes a latch assembly 22 for each leg unit for latching the leg unit in its use position as illustrated in FIGS. 1 and 2, for example. In addition, the latch assembly maintains the leg units 12 and 16 in their storage or transport position as illustrated in FIG. 6, for example.

Considering the sawhorse apparatus 10 in more detail, the cross beam 14 is an elongated member of wood, plastic or other sturdy material having a top 31, a bottom 32, ends 13 and 15 and sides 33 and 34.

The leg units 12 and 16 are identical in construction, and each includes a pair of legs 36 and 37 of wood, plastic or other sturdy material which are joined together at their upper ends to form a triangular configuration and are held securely thereat by flat plate 38 preferably of metal. The plate 38 is connected to the legs 36 and 37 in a suitable manner, such as by bolts 39 and nuts **39*a***.

Figure 9:
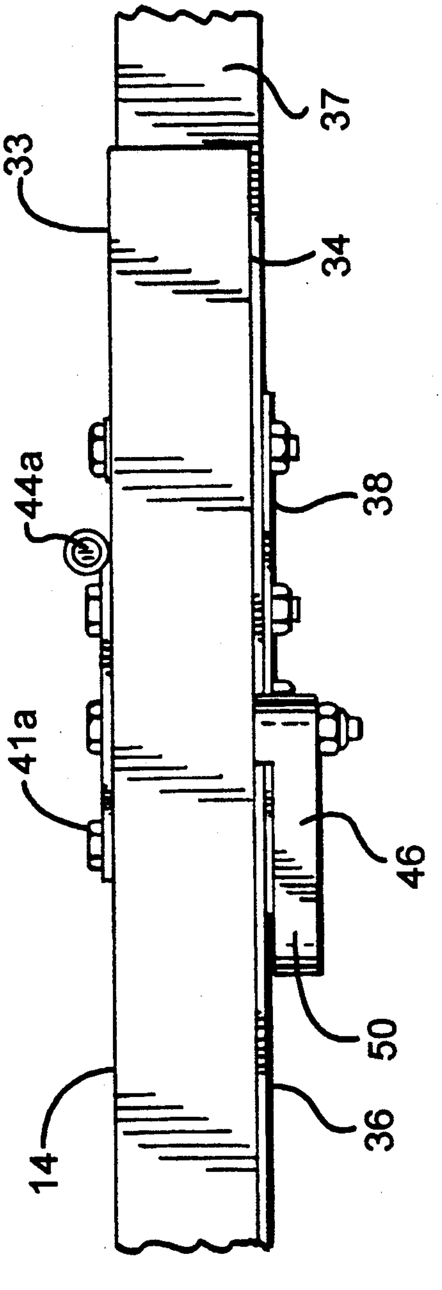
FIG. 9 is a top plan view showing the sawhorse in the storage position, wherein the lock restrains the legs in the storage position for easy transportation.
Figure 10:
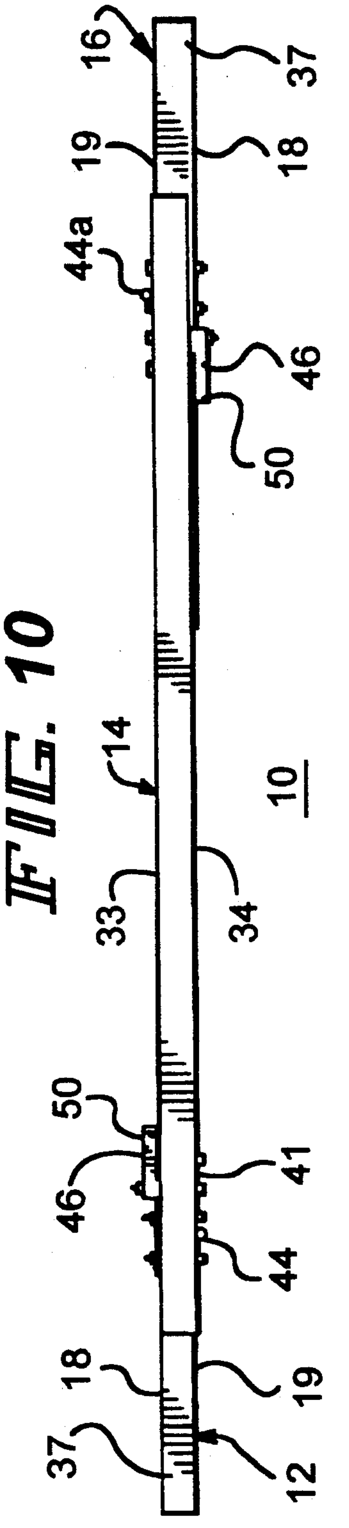
FIG. 10 is a top plan overall view showing the sawhorse in the storage position.
Figure 11:
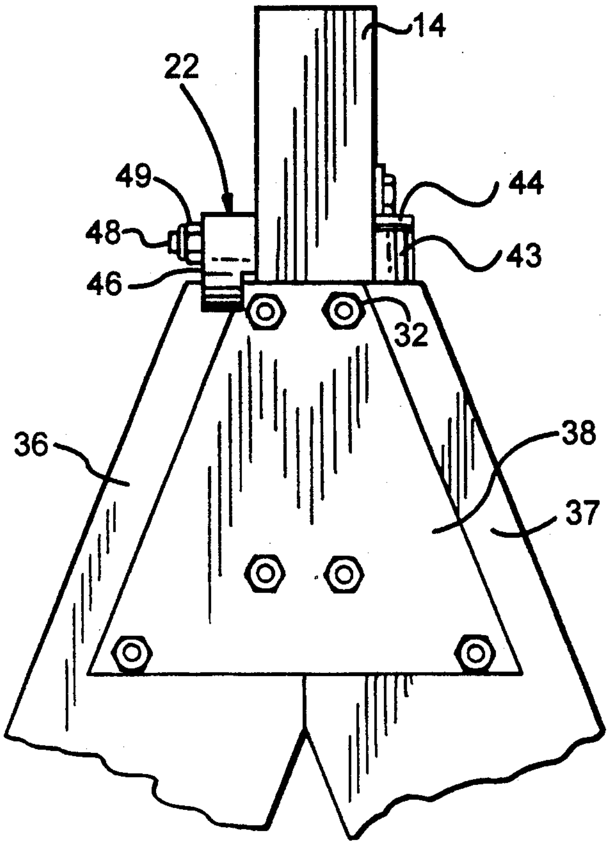
FIG. 11 is a close up end view elevation showing the sawhorse in the working position including the leg reinforcing plate and lock.
Figure 12:
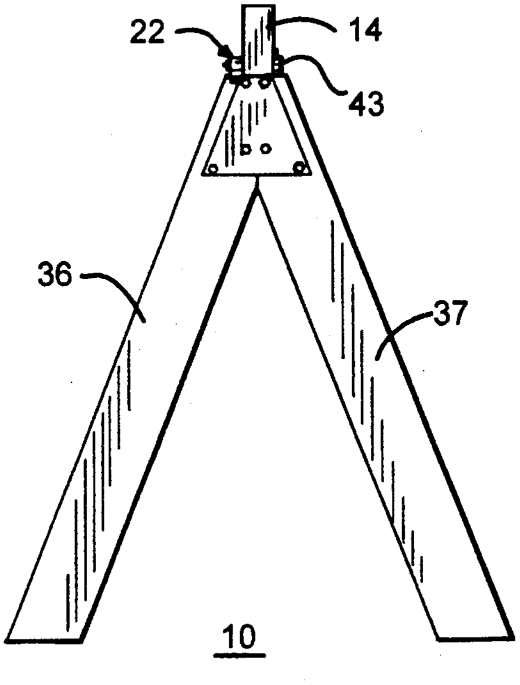
FIG. 12 is an overall end view elevation showing the sawhorse in the working position.
Figure 13:
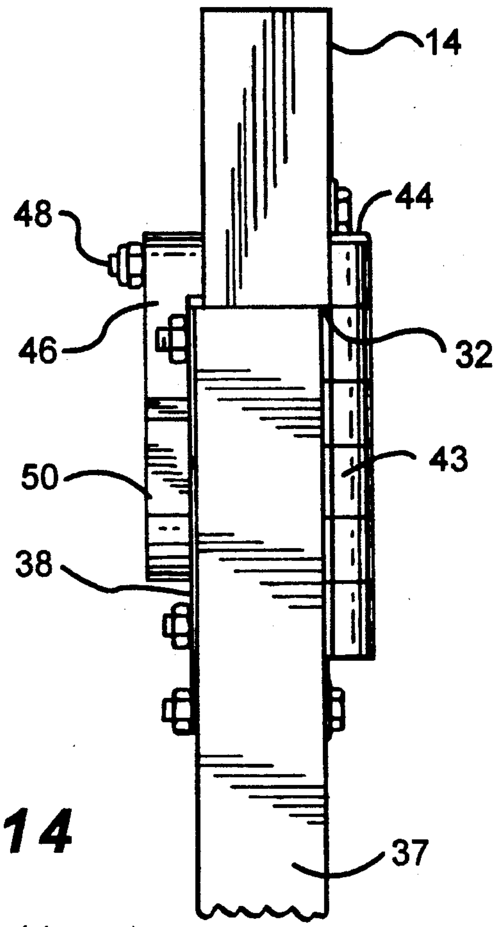
FIG. 13 is a close up end view elevation showing the sawhorse in the storage and transport position.
Figure 14:
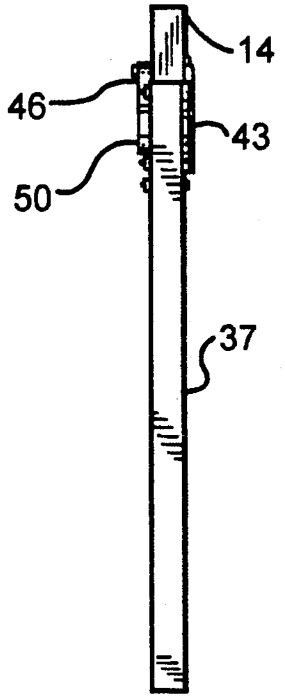
FIG. 14 is an overall end view elevation showing the sawhorse in the storage and transport position.

The hinge assemblies 20 and 21 associated with leg units 12 and 16 are identical. Referring to FIGS. 1, 3, 5 and 6, hinge assembly 20 includes a mounting plate 41 which is attached to one side 34 of the cross beam 14 near its end 13 and a second mounting plate 42 which is attached to the leg unit 12 at the apex thereof. Mounting plates 41 and 42 are secured to the cross beam 14 and leg unit 12 in a suitable manner, such as by bolts 45 and fasteners **45*a*. The hinge assembly 20 includes a hinge portion 43 including a hinge pin 44 which defines a pivot axis which extends substantially perpendicular to a plane including the bottom 32 of the cross beam 14, permitting the leg unit 12 to pivot beneath the cross beam about the pivot axis between the use position and the storage position. The hinge assemblies 20 and 21 are preferably made of metal. Comparing FIGS. 5 and 6, the leg unit 12 is pivoted 90° relative to the beam 14 in moving the leg unit 12 from its use position (FIG. 5) to its storage position (FIG. 6). In the storage position, the leg unit 12 lies in the same plane as the cross beam 14, as shown in FIGS. 9 and 10, and the dimensions of the leg unit 12 ar selected so that the thickness of the leg unit between its side surfaces 18 and 19 is approximately the same as the thickness of the cross beam 14 between its sides 33 and 34 so that no portion of the leg unit 12 extends beyond the sides 33 and 34 of the cross beam 14 when the leg unit 12** is in its storage position.

Figure 5:
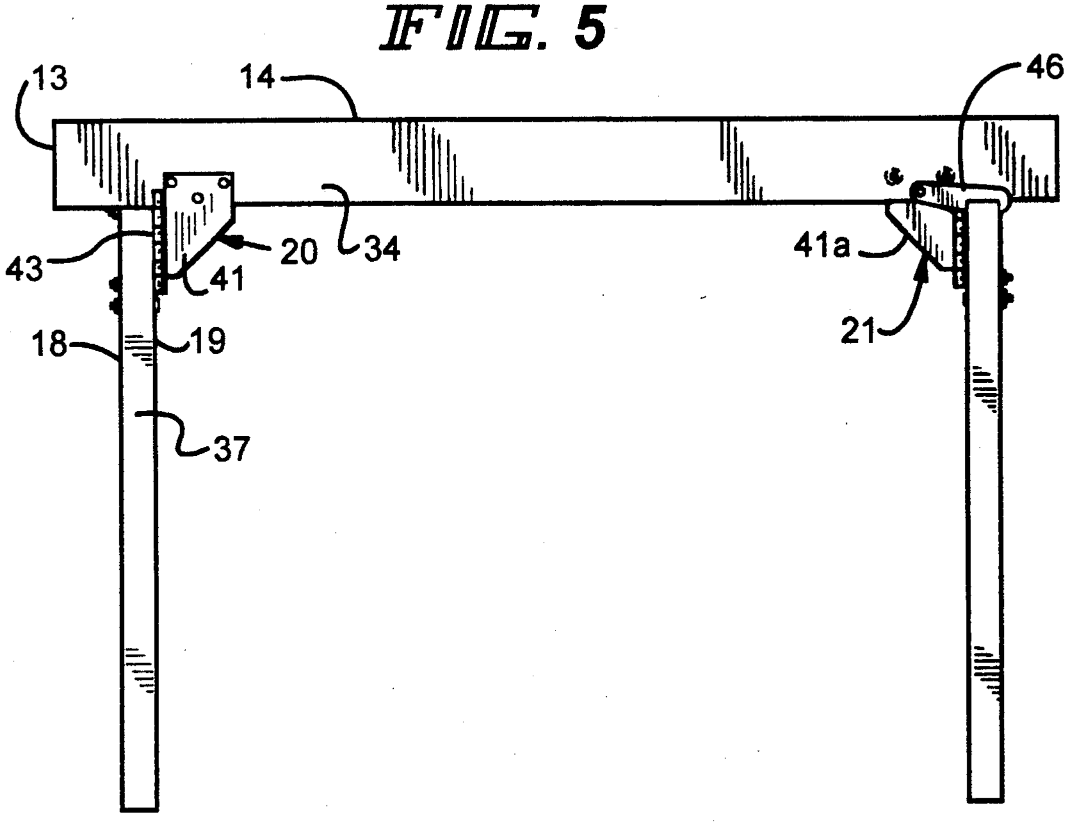
FIG. 5 is a side elevation overall view showing the sawhorse in the working position.

Referring to FIGS. 5 and 6, the leg unit 12 is continuously adjustable over a range of 0° to 90° from the storage position, illustrated in FIG. 6, to the use position illustrated in FIG. 5. Consequently, the leg unit 12 can be positioned relative to the cross beam at any angular orientation over a 90° range from its storage position to its normal use position. Moreover, the leg unit 12 can be adjusted to a position beyond its normal use position illustrated in FIG. 5. That is, the leg unit 12 can be pivoted an additional 90° beyond the normal use position to lie generally parallel to the cross beam 14, although not in the plane of the cross beam. Thus, the leg unit 12 is capable of slightly more than approximately 180° of rotation relative to the cross beam 14 and the leg unit 12 can be oriented at any incremental angular position over the 180° range.

Figure 4:
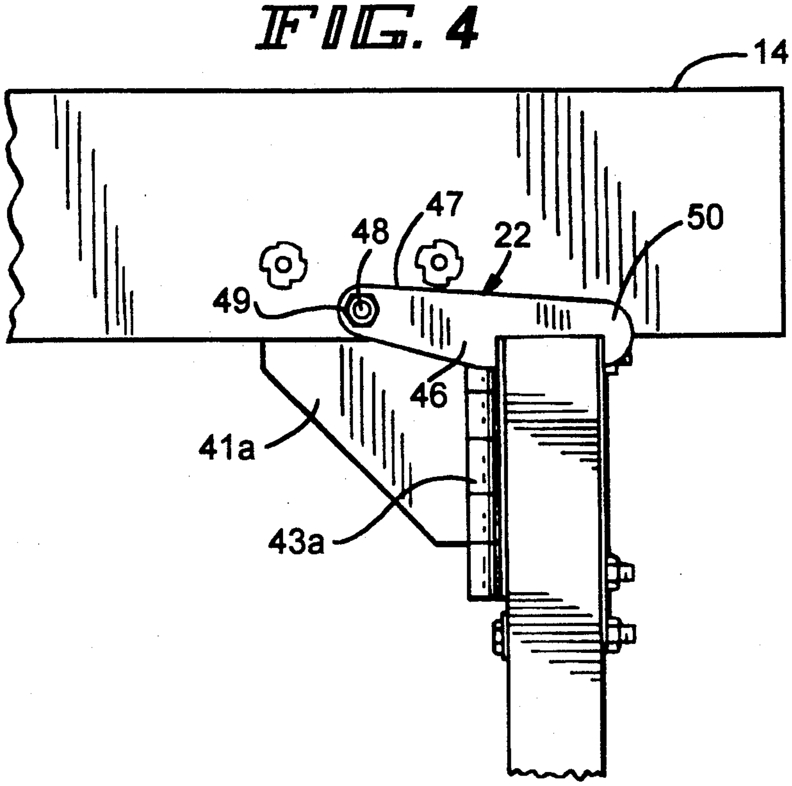
FIG. 4 is a side elevation view showing the lock and hinge in the working position.

Referring to FIGS. 2, 4 and 5, hinge assembly 21 includes a mounting plate **41*a* which is attached to side 33 of the cross beam near its end 15, and a mounting plate 42*a* which is attached to the leg unit 16 at the apex thereof. Additionally, hinge assembly 21 includes hinge portion 43*a* and hinge pin 44*a* which defines a pivot axis for leg unit 16 which extends substantially perpendicular to the bottom of the cross beam 13, permitting leg unit 16 to pivot about the pivot axis beneath the cross beam 12 between use and storage positions in the manner of leg unit 12**.

Figure 7:
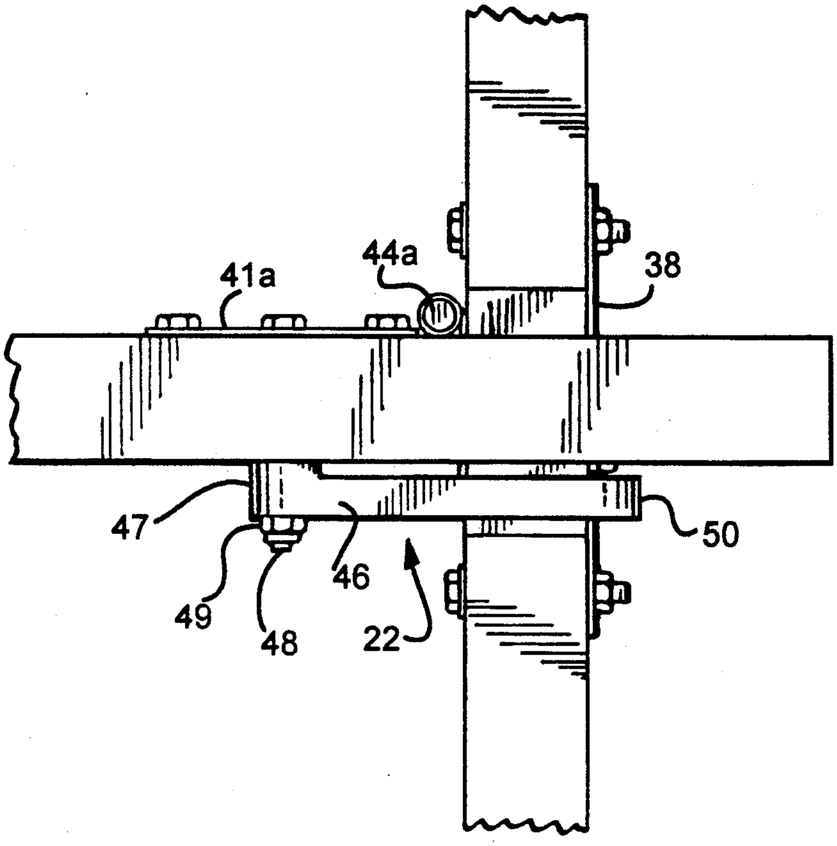
FIG. 7 is a close up plan view showing the lock and hinge disposed in the working position.
Figure 8:
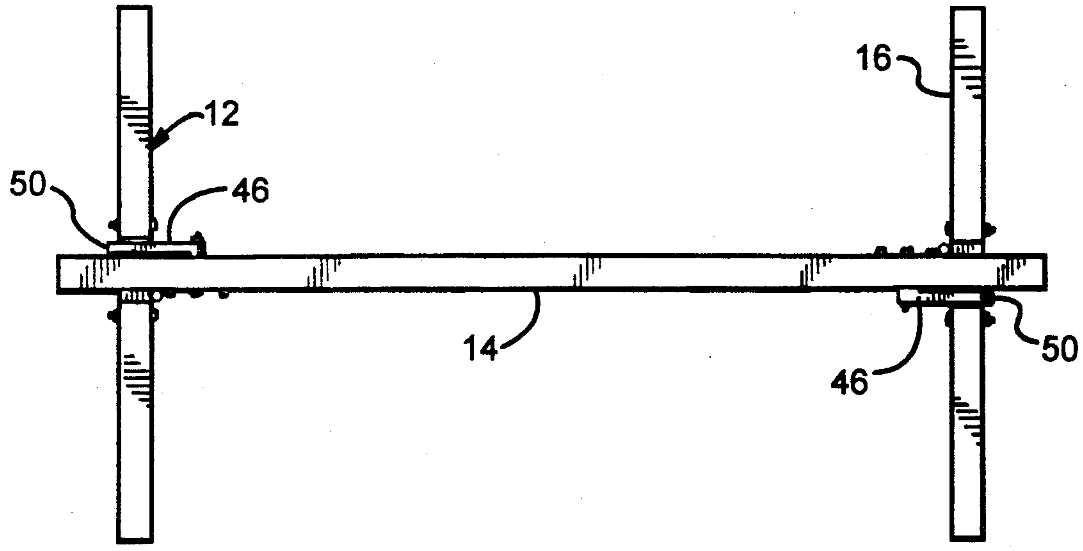
FIG. 8 is a top plan view showing the sawhorse in the working position.

Referring now to FIGS. 4, 6, 7, 8, 11 and 12, each latching assembly 22 includes a lever 46 which may be of plastic or metal. The lever 46 has one end 47 pivotally mounted to the cross beam 14 in a suitable manner such as by a bolt 48 which passes through an opening in end 47 and is secured thereto by a nut 49. Bolt 48 defines a pivot axis for lever 46, permitting lever 46 to be pivoted between a latching position shown in FIG. 4 and a holding position shown in FIG. 5. The free end 50 of the lever 46 has a notch 51 therein which engages the upper portion of leg 36 of the associated leg unit for latching the leg unit 12 in the latching position as shown in FIGS. 4 and 7. In the holding position shown in FIGS. 6, 9 and 10, the free end 50 of the lever 46 lies along the side of leg 36, preventing the leg unit from being pivoted relative to the cross beam 14 thereby holding the leg unit in its storage position.

The sawhorse apparatus 10 is stored and transported in its storage position illustrated in FIG. 6, with the leg units 12 and 16 disposed coplanar with the cross beam 14 and with the levers 46 of the two latching assemblies 22 pivoted to overlie the legs 3 to maintain the leg units 12 and 16 in the storage position.

To deploy the sawhorse apparatus 10, the lever members 46 are rotated out of overlying engagement with the leg units 12 and 16, i.e., rotating the lever 46 shown in FIG. 6 clockwise. This permits the leg units 12 and 16 to be pivoted 90° to the use position illustrated in FIGS. 1 and 5. At this position, the levers 46 can be rotated further in the same direction to bring the notch 51 into engagement with the upper end of leg 36 to latch the leg units 12 and 16 in the use position as shown in FIGS. 4, 5, 7 and 11. As has been indicated, the leg units 12 and 16 can be oriented at any position over the 0° to 180° range, but the latching assembly 22 can be used only for the use position with the leg units 12 and 16 oriented at right angles relative to the axis of the cross beam 14.

We claim:

1. A foldable work support apparatus comprising:

an elongated cross beam having a top and a bottom, first and second ends, and first and second sides having respective first and second side surfaces;

first and second leg assemblies each having first and second side surfaces;

first attachment means associated with said first leg assembly for attaching said first leg assembly to said cross beam near said first end thereof;

second attachment means associated with said second leg assembly for attaching said second leg assembly to said cross beam near said second end thereof;

each of said attachment means including hinge means having a first mounting portion connected to said cross beam and a second mounting portion connected to the associated leg assembly and a hinged joint interconnecting said first and second mounting portions and defining a pivot axis which extends substantially perpendicular to the bottom of said cross beam, permitting the associated leg assembly to pivot beneath said cross beam about said pivot axis between a use position and a storage position, and said hinge means permits said first and second leg assemblies to be individually pivoted about said pivot axis over a range of approximately 0° to 180° degrees.

2. The work support apparatus according to claim 1, including first and second latching means for latching said first and second leg assemblies in their use position.

3. The work support apparatus according to claim 1, wherein each of said leg assemblies includes first and second legs arranged in a V-configuration, and each said hinge assembly attached the associated leg assembly to said cross bean with the apex of the leg assembly located beneath the bottom of said cross beam.

4. The work support apparatus according to claim 1, including first and second latching means operable between a locking position for latching the associated leg assembly in its use position and a holding position for holding the associated leg assembly in its storage position.

5. The work support apparatus according to claim 4, wherein each of said latching means comprises a lever member pivotally mounted on said cross beam and including a notch for engaging the associated leg assembly when said lever member is moved to said latching position.

6. The work support apparatus according to claim 5, wherein said lever member overlies said leg assembly when said lever member is moved to said holding position.

7. A foldable work support apparatus comprising:

an elongated cross beam having a top and a bottom, first and second ends, and first and second sides having respective first and second side surfaces;

first and second leg assemblies each having first and second side surfaces;

first attachment means associated with said first leg assembly for attaching said first leg assembly to said cross beam near said first end thereof;

second attachment means associated with said second leg assembly for attaching said second leg assembly to said cross beam near said second end thereof;

each of said attachment means including hinge means having a first mounting portion connected to said cross beam and a second mounting portion connected to the associated leg assembly and a hinged joint interconnecting said first and second mounting portions and defining a pivot axis which extends substantially perpendicular to the bottom of said cross beam, permitting the associated leg assembly to pivot beneath said cross beam about said pivot axis between a use position and a storage position, and said first side surfaces of each leg assembly are coplanar with said first side surface of said cross beam and said second side surfaces of each leg assembly are coplanar with said second side surface of said cross beam when said leg assemblies are in said storage position.

8. The work support apparatus according to claim 7, including first and second latching means for latching said first and second leg assemblies in their use position.

9. The work support apparatus according to claim 7, wherein each of said leg assemblies includes first and second legs arranged in a V-configuration, and each said hinge assembly attaches the associated leg assembly to said cross bean with the apex of the leg assembly located beneath the bottom of said cross beam.

10. The work support apparatus according to claim 7, including first and second latching means operable between a locking position for latching the associated leg assembly in its use position and a holding position for holding the associated leg assembly in its storage position.

11. The work support apparatus according to claim 10, wherein each of said latching means comprises a lever member pivotally mounted on said cross beam and including a notch for engaging the associated leg assembly when said lever member is moved to said latching position.

12. The work support apparatus according to claim 11, wherein said lever member overlies said leg assembly when said lever member is moved to said holding position.

13. A foldable work support apparatus comprising:

an elongated cross beam having a top and a bottom, first and second ends, and first and second sides having respective first and second side surfaces;

first and second leg assemblies each having first and second side surfaces;

first attachment means associated with said first leg assembly for attaching said first leg assembly to said cross beam near said first end thereof;

second attachment means associated with said second leg assembly for attaching said second leg assembly to said cross beam near said second end thereof;

each of said attachment means including hinge means having a first mounting portion connected to said cross beam and a second mounting portion connected to the associated leg assembly and a hinged joint interconnecting said first and second mounting portions and defining a pivot axis which extends substantially perpendicular to the bottom of said cross beam, permitting the associated leg assembly to pivot beneath said cross beam about said pivot axis between a use position and a storage position, and wherein the thickness of each leg assembly between its side surfaces is approximately the same as the thickness of the cross beam between its first and second sides, whereby the leg assemblies do not project beyond the side of said cross beam when said leg assemblies are in the storage position.

14. The work support apparatus according to claim 13, including first and second latching means for latching said first and second leg assemblies in their use position.

15. The work support apparatus according to claim 13, wherein each of said leg assemblies includes first and second legs arranged in a V-configuration, and each said hinge assembly attaches the associated leg assembly to said cross bean with the apex of the leg assembly located beneath the bottom of said cross beam.

16. The work support apparatus according to claim 13, including first and second latching means operable between a locking position for latching the associated leg assembly in its use position and a holding position for holding the associated leg assembly in its storage position.

17. The work support apparatus according to claim 16, wherein each of said latching means comprises a lever member pivotally mounted on said cross beam and including a notch for engaging the associated leg assembly when said lever member is moved to said latching position.

18. The work support apparatus according to claim 17, wherein said lever member overlies said leg assembly when said lever member is moved to said holding position.

19. A foldable sawhorse apparatus comprising:

an elongated cross beam having a top and a bottom, first and second ends, and first and second sides having respective first and second side surfaces;

first and second leg assemblies each having first and second side surfaces;

first attachment means associated with said first leg assembly for attaching said first leg assembly to said cross beam near said first end thereof; and second attachment means associated with said second leg assembly for attaching said second leg assembly to said cross beam near said second end thereof;

each of said attachment means including hinge means having a first mounting portion connected to said cross beam, a second mounting portion connected to the associated leg assembly and a hinged joint interconnecting said first and second mounting portions and defining a pivot axis which extends substantially perpendicular to the bottom of said cross beam, permitting the associated leg assembly to pivot beneath said cross beam about said pivot axis between a use position and a storage position in which said first side surfaces of each leg assembly are coplanar with said first side surface of said cross beam and said second side surfaces of each leg assembly are coplanar with said second side surface of said cross beam.

20. The work support apparatus according to claim 19, wherein said attachment means permits said first and second leg assemblies to be individually pivoted about said pivot axis over a range of approximately 0° to 180° degrees.

21. The work support apparatus according to claim 19, including first and second latching means for latching said first and second leg assemblies in their use position.

22. The work support apparatus according to claim 19, wherein each of said leg assemblies includes first and second legs arranged in a V-configuration, and each said hinge assembly attaches the associated leg assembly to said cross bean with the apex of the leg assembly located beneath the bottom of said cross beam.

23. The work support apparatus according to claim 19, including first and second latching means operable between a locking position for latching the associated leg assembly in its use position and a holding position for holding the associated leg assembly in its storage position.

24. The work support apparatus according to claim 23, wherein each of said latching means comprises a lever member pivotally mounted on said cross beam and including a notch for engaging the associated leg assembly when said lever member is moved to said latching position.

25. The work support apparatus according to claim 24, wherein said lever member overlies said leg assembly when said lever member is moved to said holding position.

* * * * *